(12) United States Patent
Bowen et al.

(10) Patent No.: US 9,708,092 B2
(45) Date of Patent: Jul. 18, 2017

(54) COMPOSITIONS AND METHODS FOR MANUFACTURING BLOW MOLDED CONTAINERS

(71) Applicant: Printpack Illinois, Inc., Elgin, IL (US)

(72) Inventors: Steve Bowen, Hayes, VA (US); Vivek Chougule, Bangalore (IN); Rabeh Elleithy, Williamsburg, VA (US)

(73) Assignee: Printpack Illinois, Inc., Elgin, IL (US)

( * ) Notice: Subject to any disclaimer, the term of this patent is extended or adjusted under 35 U.S.C. 154(b) by 0 days.

(21) Appl. No.: 15/124,886

(22) PCT Filed: Mar. 10, 2015

(86) PCT No.: PCT/US2015/019697
§ 371 (c)(1),
(2) Date: Sep. 9, 2016

(87) PCT Pub. No.: WO2015/138443
PCT Pub. Date: Sep. 17, 2015

(65) Prior Publication Data
US 2017/0015458 A1    Jan. 19, 2017

Related U.S. Application Data

(60) Provisional application No. 61/951,089, filed on Mar. 11, 2014.

(51) Int. Cl.
*B65D 1/02*     (2006.01)
*B29C 49/00*    (2006.01)
(Continued)

(52) U.S. Cl.
CPC ........ *B65D 1/0207* (2013.01); *B29C 49/0005* (2013.01); *B29C 49/02* (2013.01);
(Continued)

(58) Field of Classification Search
CPC .... B65D 1/0207; B65D 1/0215; B29C 49/02; B29C 2049/021; B29L 2031/712
See application file for complete search history.

(56) References Cited

U.S. PATENT DOCUMENTS

2008/0058437 A1    3/2008 Burgun et al.
2012/0201921 A1    8/2012 Sequeira
(Continued)

OTHER PUBLICATIONS

Search Report and Written Opinion for International Application No. PCT/US2015/019697, mailed Aug. 11, 2015 (8 pages).
(Continued)

*Primary Examiner* — Michael C Miggins
(74) *Attorney, Agent, or Firm* — Eversheds Sutherland (US) LLP

(57) ABSTRACT

Blow molded containers and methods for making the same are provided. A blow molded container has a container wall including a thermoplastic polymer material having a rheology melt strength ($R_{ms}$) of at least 30 Pa·s². A method of making a container includes providing a material sheet including at least one thermoplastic polymer layer having a rheology melt strength ($R_{ms}$) of at least 30 Pa·s², forming the material sheet into a tube, sealing the tube at a seal area, and blow molding the tube to form a container.

12 Claims, 4 Drawing Sheets

(51) Int. Cl.
  *B29C 49/02* (2006.01)
  *B29C 49/22* (2006.01)
  *B29L 31/00* (2006.01)

(52) U.S. Cl.
  CPC ............ *B65D 1/0215* (2013.01); *B29C 49/22* (2013.01); *B29C 2049/021* (2013.01); *B29L 2031/712* (2013.01)

(56) References Cited

U.S. PATENT DOCUMENTS

2013/0032963 A1    2/2013   Tokiwa et al.
2013/0079430 A1    3/2013   Jintoku et al.

OTHER PUBLICATIONS

International Preliminary Report on Patentability for International Application No. PCT/US2015/019697, mailed May 3, 2016 (25 pages).
Jahani, et al., "Rheological and Mechanical Study of Polypropylene Ternary Blends for Foam Application," Iranian Polymer Journal, 2005, 14 (4), pp. 361-370.
Dharia, et al., "Properties and Applications of Blends of High Melt Strength PP and Linear PP," Annual Technical Conference—Society of Plastics Engineers, 2005, pp. 2156-2162.

ions and methods for manufacturing blow molded containers

CROSS-REFERENCE TO RELATED APPLICATIONS

This application is a U.S. national stage application of International Application Number PCT/US2015/019697, filed Mar. 10, 2015, which claims priority to U.S. Provisional Application No. 61/951,089, filed Mar. 11, 2014, the disclosures of which are incorporated by reference herein in their entirety.

FIELD OF THE DISCLOSURE

The present disclosure relates generally to container manufacturing, and more specifically to compositions and methods for manufacturing blow molded containers.

BACKGROUND

Bottles and other containers may be manufactured by various processes, such as thermoforming, rotomolding, blow molding, injection molding, or extrusion blow molding. A thermoforming process referred to as "Roll-N-Blow" has been developed by Agami, in which 3-D containers are formed via blow molding a sheet or film, as disclosed in PCT Publication No. WO2010/007004, which is incorporated by reference herein in its entirety. However, only limited types of thermoplastic materials have been used to form the sheet or film for these processes.

Accordingly, there is a need for alternative suitable material sheet compositions and methods for manufacturing blow molded containers, for example via Roll-N-Blow.

SUMMARY

In one aspect, a blow molded container is provided, including a container wall comprising a thermoplastic polymer material having a rheology melt strength ($R_{ms}$) of at least 30 Pa·s$^2$.

In another aspect, a method of making a container, including providing a material sheet comprising at least one thermoplastic polymer layer having a rheology melt strength ($R_{ms}$) of at least 30 Pa·s$^2$, forming the material sheet into a tube, sealing the tube at a seal area, and blow molding the tube to form a container.

DETAILED DESCRIPTION

Figure 1:
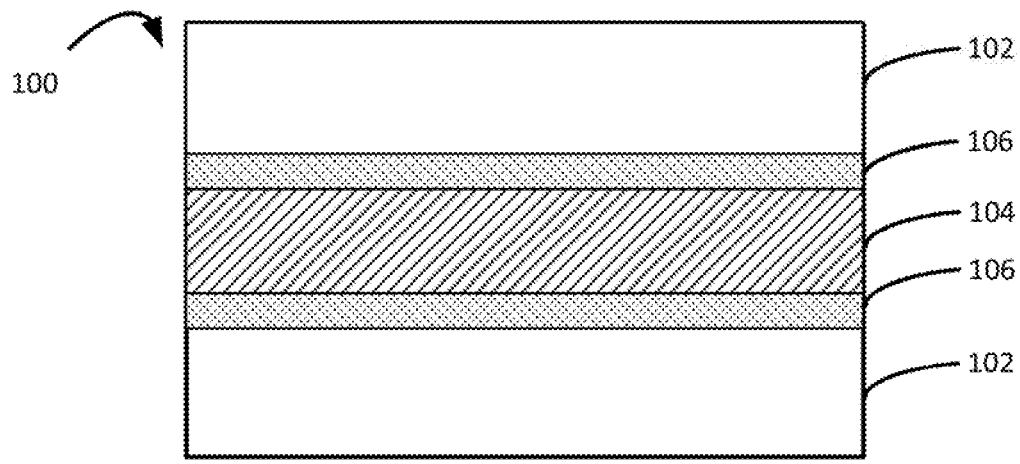
FIG. 1 is a cross-sectional plan view, showing one embodiment of a sheet material for manufacturing blow molded containers.

The present invention addresses the challenges that could arise when using traditional resins with processing methods, such as the Roll-N-Blow process, by providing improved compositions for manufacturing containers via a blow molding process. Several embodiments of sheet material compositions, containers made therefrom, and methods for making these containers are described below. Parameters of different steps, components, and features of the embodiments are described separately, but may be combined consistently with this description and claims to enable still other embodiments as will be understood by those skilled in the art. While embodiments may be described with reference to certain processes, e.g., Roll-N-Blow, it should be understood that the compositions described herein may be used in a variety of thermoforming, blow molding, and other container manufacturing processes.

Blow molded containers according to certain embodiments of the present invention may be made by first shaping a material sheet in a tube, forming a lap weld in which the inside surface of the sheet is welded to the outside surface along the seam of the tube, then heating the tube and blowing it into the desired shape inside a mold. The tube's bottom may then be sealed or welded, such as by a fin weld, by pressing the hot material together.

Traditionally, polystyrene materials have been used to form the material sheet or film used in blow molding processes. The inventors have developed alternative material compositions which advantageously are also capable of being used to form the material sheet or film from which suitable containers may be made via a blow molding process, such as Roll-N-Blow.

Material sheet compositions, containers made therefrom, and example methods for their manufacture will be described hereinafter in more detail.

Blow Molded Containers and Material Sheet Compositions

In certain embodiments, polyolefin or other thermoplastic-based formulations have been developed for the manufacture of blow molded containers.

In certain embodiments, a blow molded container includes a container wall having a thermoplastic polymer material having a rheology melt strength ($R_{ms}$) of at least 30 Pa·s$^2$. For example, the container wall may be formed of any of the neat thermoplastic materials or blends of thermoplastic materials described herein. Thermoplastic polymers may include polyolefins, such as polypropylene or polyethylene, polystyrenics, such as polystyrene or high impact polystyrene, polyesters, such as polyethylene terephthalate, polylactic acid, post-consumer resins, recycled regrinds, or any combination thereof. In one embodiment, the thermoplastic polymer material includes a blend of a high melt strength polypropylene and a low melt strength polypropylene. In another embodiment, the material includes a blend of a low melt strength polypropylene and a high density polyethylene. In another embodiment, the material includes a blend of a high melt strength polypropylene and a high density polyethylene.

For example, a high melt strength polypropylene may have a rheology melt strength ($R_{ms}$) of at least 150 Pa·s$^2$, such as at least 1,000 Pa·s$^2$, or at least 5,000 Pa·s$^2$. A low melt strength polypropylene may have a rheology melt strength ($R_{ms}$) of at least 10 Pa·s$^2$, such as at least 30 Pa·s$^2$, or at least 50 Pa·s$^2$. In certain embodiments, a high melt strength polypropylene has a rheology melt strength ($R_{ms}$) from about 150 Pa·s$^2$ to about 10,000 Pa·s$^2$, or from about 5,000 Pa·s$^2$ to about 10,000 Pa·s$^2$. In certain embodiments, a low melt strength polypropylene may have a rheology melt strength ($R_{ms}$) from about 10 Pa·s$^2$ to about 100 Pa·s$^2$, or from about 30 Pa·s$^2$ to about 90 Pa·s$^2$. In one embodiment, the high melt strength polypropylene has a rheology melt strength ($R_{ms}$) of about 1,000 Pa·s² to about 10,000 Pa·s² and the low melt strength polypropylene has a rheology melt strength ($R_{ms}$) of about 30 Pa·s² to about 90 Pa·s².

In one embodiment, the material includes from about 10 to about 99 percent by weight of the high melt strength polypropylene and from about 1 to about 90 percent by weight of the low melt strength polypropylene. For example, the material may include from about 40 to about 80 percent by weight of the high melt strength polypropylene and from about 20 to about 60 percent by weight of the low melt strength polypropylene. In one embodiment, the material includes 80 percent by weight of the high melt strength polypropylene and 20 percent by weight of the low melt strength polypropylene. For example, the material may include a blend of low melt strength polypropylene and high melt strength polypropylene in a weight ratio of 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, and ratios therebetween, depending on the desired container processing and performance properties. In another embodiment, the material includes 100 percent by weight high melt strength polypropylene.

In one embodiment, the material includes from about 10 to about 90 percent by weight of the low melt strength polypropylene and from about 10 to about 90 percent by weight of the high density polyethylene. For example, the material may include from about 30 to about 80 percent by weight of the low melt strength polypropylene and from about 20 to about 70 percent by weight of the high density polyethylene. In one embodiment, the material includes about 70 percent by weight of the low melt strength polypropylene and about 30 percent by weight of the high density polyethylene. For example, the material may include a blend of low melt strength polypropylene and high density polyethylene in a weight ratio of 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, and ratios therebetween, depending on the desired container processing and performance properties.

In one embodiment, the material includes from about 10 to about 90 percent by weight of the high melt strength polypropylene and from about 10 to about 90 percent by weight of the high density polyethylene. For example, the material may include from about 30 to about 80 percent by weight of the high melt strength polypropylene and from about 20 to about 70 percent by weight of the high density polyethylene. For example, the material may include a blend of high melt strength polypropylene and high density polyethylene in a weight ratio of 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, and ratios therebetween, depending on the desired container processing and performance properties.

In certain embodiments, the thermoplastic polymer, e.g., polyolefin, includes additives, such as colorant, e.g., white or black, fillers, reinforcement, nucleators, clarifiers, stabilizers, antioxidants, adhesion promoters, or other suitable property enhancers. In certain embodiments the melt strength of polyolefins can be increased by use of high aspect ratio fillers, such as fibers and/or platelets. In certain embodiments melt strength of polyolefins can be increased by crosslinking the polymer by methods such as exposure to radiation (e.g., gamma radiation), and/or use of crosslinking-promoting additives, such as peroxides or other suitable additives.

Depending on the desired performance and processing properties of the blow molded containers, the material sheet may display a certain drop impact strength. For example, the sheet material may display an effective drop weight impact height normalized to thickness of above about 100 in/in, from about 100 in/in to about 400 in/in, or from about 150 in/in to about 275 in/in. For example, these values may be measured using a Gardner impact tester with 4 pound load.

The composition of the material sheet may be designed such that the thermoplastic polymer material has a rheology melt strength ($R_{ms}$) of at least 30 Pa·s². For example, the thermoplastic polymer material may have a rheology melt strength ($R_{ms}$) of at least 150 Pa·s², from about 150 Pa·s² to about 10,000 Pa·s², from about 1,000 Pa·s² to about 10,000 Pa·s², or from about 5,000 Pa·s² to about 10,000 Pa·s².

To achieve the desired performance and processing properties of the blow molded containers, the material sheet composition may be tailored to have certain properties, including certain molecular weight and/or molecular weight distributions, long chain branches, shear rates at the critical value ($G_c$), viscosities at low shear rate, and loss factors at low shear rate, which may affect the rheology melt strength ($R_{ms}$) of the material sheet composition, as discussed in more detail in the Examples section below. The critical value $G_c$ is defined as the modulus at which the storage modulus is equal to the loss modulus. For example, the sheet material composition may be designed to have a molecular weight distribution of above 2.0, from about 2.0 to about 9.0, or from about 3.0 to about 5.0. The material molecular weight distribution may be calculated according to the formula: weight average molecular weight/number average molecular weight. For example, the sheet material composition may be designed to have a shear rate at $G_c$ from about 9 s⁻¹ to about 22 s⁻¹, or from about 9 s⁻¹ to about 37 s⁻¹. For example, the sheet material composition may be designed to have a viscosity at low shear rate of at least 5 kPa·s, from 5 kPa·s to about 40 kPa·s, or from about 15 kPa·s to about 35 kPa·s. For example, the sheet material composition may have a loss factor at low shear rate of less than 15, for example from about 1 to about 25, or from about 2 to about 10. The loss factor may be calculated according to the formula: loss modulus/storage modulus.

In certain embodiments, the material sheet forming the container wall may have a thickness from about 0.1 mm to about 2.0 mm. In one embodiment, the container wall has a thickness of less than 1.5 mm. For example, the container wall may have a thickness from about 0.15 mm to about 1.0 mm, or from about 0.5 mm to about 2.0 mm. In certain embodiments, the material sheet is coextruded or laminated.

The containers may be produced from single or multi-layer materials. In the case a high barrier container is desired, a multilayer material sheet may be utilized. One or more barrier layers, such as one, two, three, four, or more barrier layers, may be included in a multi-layer material to extend the shelf life of food or beverage products to be packaged in a container made therefrom. For example, barrier layers may be used where products to be packaged are sensitive to certain gases, or loss of volatiles, flavors, or aromas. For example, the barrier layers may include ethylene vinyl alcohol, nylon (polyamide), polyvinylidene chloride, liquid crystalline polymer, or any combination thereof. The barrier layers may also include barrier enhancing additives, such as nano-additives or oxygen scavengers. Embodiments of the material sheet may include a combination of different barrier layers or substantially similar barrier layers. For example, containers may be made in accordance with the materials and methods described in U.S. Provisional Patent Application No. 61/864,795, entitled "Method for Manufacturing Multi-Barrier Layer Blow Molded Containers," which is incorporated herein by reference in its entirety. In certain embodiments, the material sheet may include one or more printed layers. The material sheet composition can further be printed upon, laminated to printed film, or coated with materials to improve properties such as barrier, non-stick, thermochromic, and/or special visual effects properties.

Figure 2:
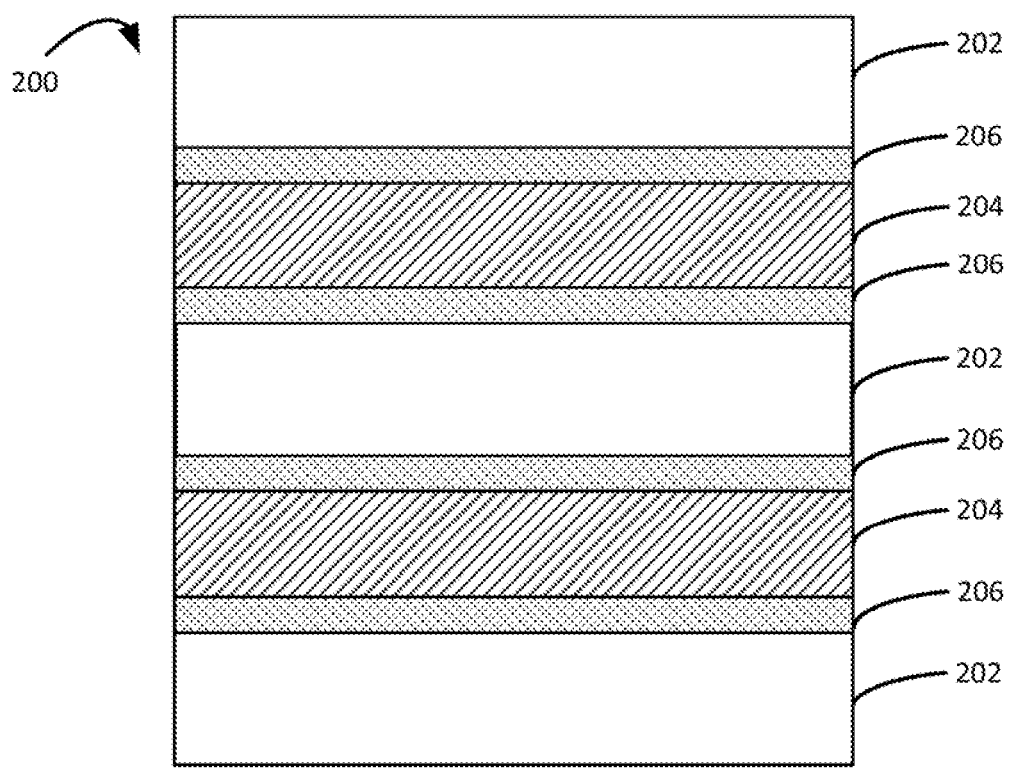
FIG. 2 is a cross-sectional plan view, showing another embodiment of a sheet material for manufacturing blow molded containers.

As shown in FIG. 1, a material sheet 100 includes two thermoplastic polymer layers 102, one barrier layer 104 disposed between the two polymer layers, and two adhesive layers 106. As shown in FIG. 2, the material sheet 200 includes three polymer layers 202, two barrier layers 204 disposed as inner layers between the two outer polymer layers, and four adhesive layers 206. One or more of the thermoplastic polymer layers may have a formulation as described herein. For example, one or more of the polymer layers may be designed such that the layer has a rheology melt strength ($R_{ms}$) of at least 30 Pa·s$^2$.

The adhesive layers may be disposed between a polymer layer and a barrier layer, between two polymer layers, or between two barrier layers. Alternatively, the polymer and/or barrier layers may be disposed adjacent to one another without an adhesive layer therebetween. In certain embodiments, the adhesive layers include polypropylene grafted with a functional group such as maleic anhydride, polyethylene grafted with a functional group such as maleic anhydride, a polystyrene/polypropylene copolymer, such as an interpenetrated copolymer, a polystyrene/polyethylene copolymer, such as an interpenetrated copolymer, or any combination thereof. Similar or different adhesive layers may be used in a single material sheet.

Methods of Making the Containers

In certain embodiments, methods of making containers include: (i) providing a material sheet comprising at least one thermoplastic polymer layer having a rheology melt strength ($R_{ms}$) of at least 30 Pa·s$^2$; (ii) forming the material sheet into a tube; (iii) sealing the tube at a seal area; and (iv) blow molding the tube to form a container.

Figure 3:
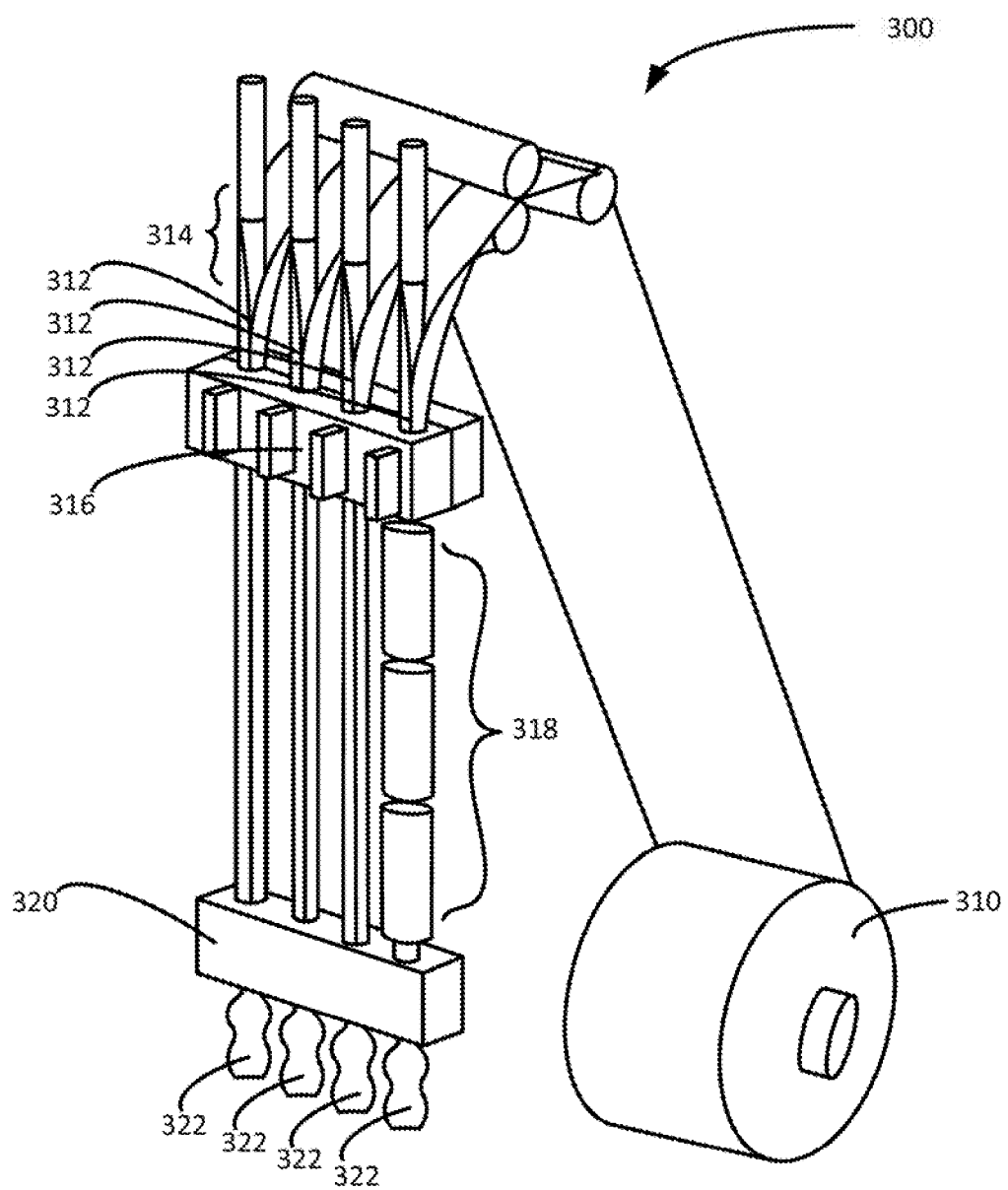
FIG. 3 is a perspective view, showing one embodiment of an apparatus for making blow molded containers.

As shown in FIG. 3, a roll of the material sheet 310 is provided to apparatus 300. The material sheet 310 is formed into one or more tubes 312 at tube forming section 314. For example, the material sheet may be shaped into a tube around a mandrel. The tubes 312 are then sealed at sealing section 316 and blown through mold 320 to form containers 322. In certain embodiments, as shown in FIG. 3, methods of making containers also include slitting the material sheet 310 into more than one strip and forming each of the strips into a tube 312. For example, the material sheet may be slit in the machine direction. While FIG. 3 shows a vertical process, it should be understood that the described methods could be performed in a horizontal or other suitable processes.

In certain embodiments, the tubes are sealed with a lap seal. The tubes may be sealed using methods known to persons of ordinary skill in the art. For example, the tubes may be sealed using heat welding, ultrasonic welding, or induction welding techniques. For example, the tubes may be sealed lengthwise along the lap seal.

In certain embodiment, the tubes 312 are heated at heating section 318. For example, the step of blow molding the tubes may include heating the tube and blowing the tube against a mold. For example, the tubes may be blown against a chilled mold, and then the formed containers may be separated and released from the mold. These methods may be employed to manufacture containers in a form-fill-seal type operation in which the containers are formed, filled with product, and sealed in a continuous process.

The thermoplastic polymer layer may include any neat or blended thermoplastic material composition disclosed herein, including a blend of a high melt strength polypropylene and a low melt strength polypropylene, a blend of a low melt strength polypropylene and a high density polyethylene, or a blend of a high melt strength polypropylene and a high density polyethylene. The properties of the thermoplastic polymer layer may be tailored based on the processing and application parameters, such as by designing the thermoplastic material sheet composition to have a desired rheology melt strength ($R_{ms}$), molecular weight distributions, shear rates at $G_c$, viscosities at low shear rate, and loss factors at low shear rate.

In certain embodiments, the methods also include blending the thermoplastic materials to form the material sheet composition. In one embodiment, the method includes blending a high melt strength polypropylene and a low melt strength polypropylene to form the material sheet. In another embodiment, the method includes blending a low melt strength polypropylene and high density polyethylene. In another embodiment, the method includes blending a high melt strength polypropylene and high density polyethylene. For example, the materials may be dry or wet blended. The methods may also include laminating, extruding, co-extruding, or coating the thermoplastic material to form the material sheet.

Blow molding advantageously allows for the manufacture of containers having a variety of shapes and sizes. Thus, these methods allow for the manufacture of containers of diverse sizes and shapes from alternative materials.

The present invention may be further understood with reference to the following non-limiting examples.

EXAMPLES

Various sheet materials were prepared to be used in blow molding processes.

The materials used to form the sheets used for blow molding included: HDPE, blends of low melt strength PP with HDPE, a high melt strength PP with wide molecular weight distribution, and blends of low melt strength PP with high melt strength PP with wide molecular weight distribution. Table 1 contains the material properties of the raw materials used throughout the examples.

TABLE 1

Material Properties of Raw Materials Used in Examples

| Material | Melt Flow Rate (g/10 min) | Modulus (ksi) | Yield Strength (ksi) | Specific Gravity |
|---|---|---|---|---|
| HDPE | 0.8 | 225 | 4.6 | 0.96 |
| Low Melt Strength PP | 3.0 | 268 | 6.5 | 0.91 |
| High Melt Strength PP | 0.5 | 215 | 4.4 | 0.90 |

The inventors found that adding a HMS PP polymer improved the drop weight impact properties of the containers, as seen in Table 2, which gives the effective drop impact height normalized to the thickness of containers made using various blended sheet material compositions. For the drop impact test, ASTM D5420 was used as a guideline, and the test was performed using a Gardner impact tester with 4 pound load.

TABLE 2

Drop Weight Impact Properties (Effective Height Normalized to Thickness) of Containers Made Using Various Sheet Material Compositions

| Sheet Material Composition | Effective Height Normalized to Thickness (in/in) |
|---|---|
| 68% LMS PP, 30% HPDE, 2% white additive | 119.1 |
| 80% LMS PP, 20% HMS PP | 187.8 |
| 60% LMS PP, 40% HMS PP | 251.6 |
| 50% LMS PP, 50% HMS PP | 223.2 |
| 30% LMS PP, 70% HMS PP | 266.9 |
| 98% HMS PP, 2% white additive | 323.4 |

As can be seen from Table 2, compositions containing the HMS PP blended with the LMS PP demonstrate improved impact strength as compared to a 70:30 blend of LMS PP and HDPE. A 98:2 blend of HMS PP and white additive showed the best impact strength of the samples.

Table 3 shows various material properties used for determining the rheology melt strength ($R_{ms}$) for different sheet material compositions. Specifically, the molecular weight distribution, shear rate at $G_c$, viscosity at low shear rate, and loss factor at low shear rate are given for pure LMS PP and HMS PP, as well as for various blends. The molecular weight distribution was determined by using a plate-plate rheometer. The shear rate was determined during the rheology test using a plate-plate rheometer. The viscosity at low shear rate was determined during the rheology test using a plate-plate rheometer. The loss factor at low shear rate was determined during the rheology test using a plate-plate rheometer.

TABLE 3

Properties of Various Sheet Material Compositions For Determining Rheology melt strength ($R_{ms}$)

| Sheet Material Composition | Molecular Weight Distribution | Shear Rate at $G_c$ (s$^{-1}$) | Viscosity at Low Shear Rate (Pa · s) | Loss Factor at Low Shear Rate |
|---|---|---|---|---|
| 100% LMS PP | 2.94 | 30.9 | 6.276 | 19.12 |
| 100% HMS PP | 4.58 | 9.1 | 37.829 | 1.93 |
| 80% LMS PP, 20% HMS PP | 3.28 | 21.4 | 9.119 | 9.71 |
| 50% LMS PP, 50% HMS PP | 3.98 | 15.8 | 13.233 | 4.29 |
| 70% LMS PP, 30% HDPE | 4.23 | 36.6 | 10.786 | 4.08 |

The properties measured in Table 3 were then used to compute the rheology melt strength ($R_{ms}$) for the different sheet material compositions, using a formula that has been developed for this purpose: $R_{ms}$=(Viscosity*Molecular Weight Distribution)/(Shear Rate*Loss Factor). The computed $R_{ms}$ values are given in Table 4.

TABLE 4

Rheology melt strength ($R_{ms}$) for Various Sheet Material Compositions

| Sheet Material Composition | Rheology melt strength ($R_{ms}$) (Pa · s$^2$) |
|---|---|
| 100% LMS PP | 33 |
| 100% HMS PP | 9865 |
| 80% LMS PP, 20% HMS PP | 144 |
| 50% LMS PP, 50% HMS PP | 777 |
| 70% LMS PP, 30% HDPE | 305 |

Figure 4:
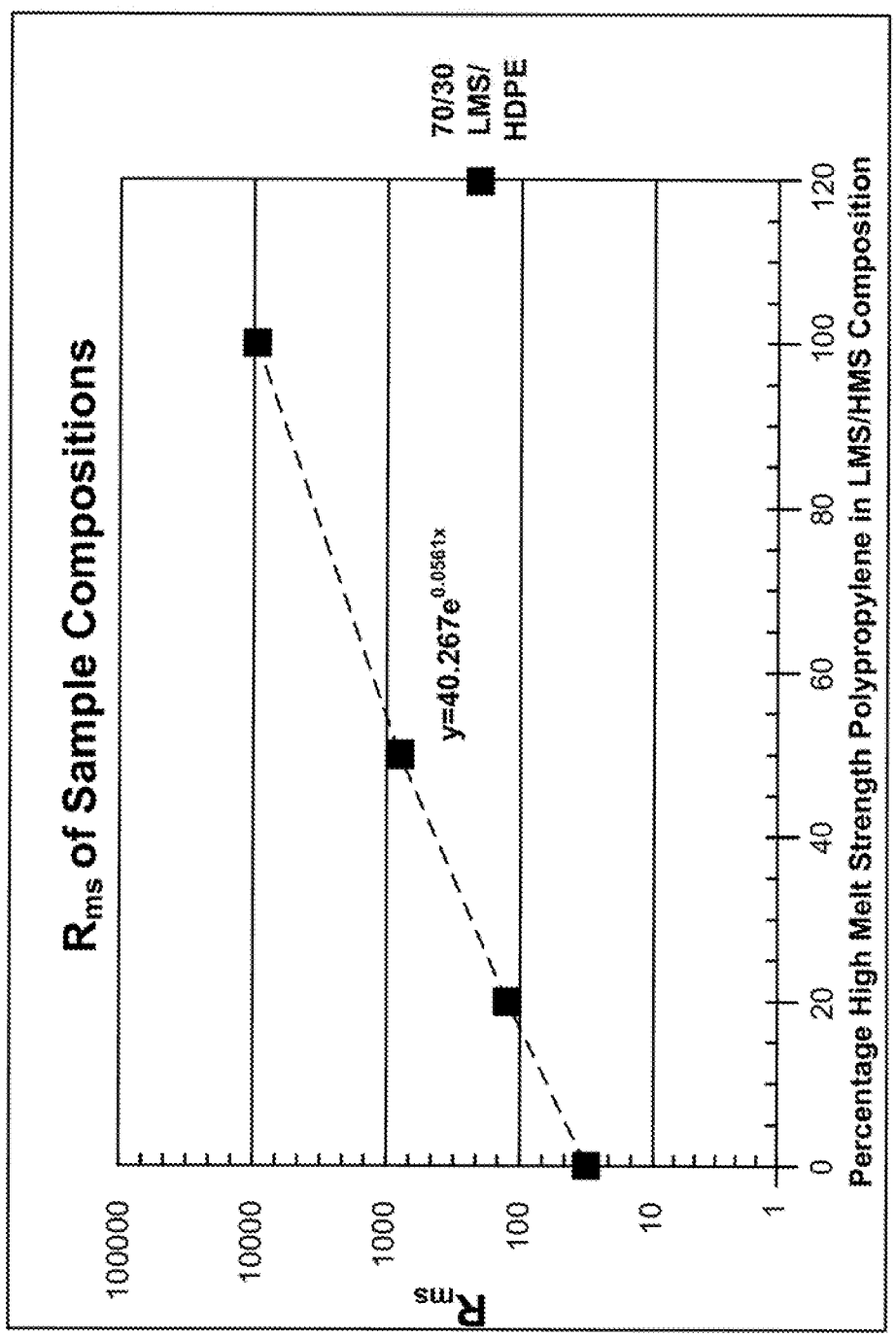
FIG. 4 is a graph showing the rheology melt strength ($R_{ms}$) data for a variety of sheet material compositions.

The rheology melt strength ($R_{ms}$) data points calculated in Table 4 were plotted in the graph shown in FIG. 4, and an empirical correlation was developed based on the rheological behavior of these sample formulations. As shown in FIG. 4, the correlation developed is, $R_{ms}=40\ e^{0.06*(\%\ of\ Sample\ HMS\ PP)}$ where the sample includes both HMS and LMS PP, and the "% of sample HMS PP" is the weight percentage of the HMS PP in the sheet material composition. The inventors have found that this empirical correlation may be used to predict the suitability and behavior of different material formulations containing a blend of HMS and LMS PP's, in the manufacture of blow molded containers.

Thus, these examples show that the performance and manufacturing properties of blow-molded containers can be tailored based on the composition of the sheet material used. Based on the developed correlation, blends of HMS and LMS PP may be prepared to meet manufacturing and processing specifications for various blow molding applications. However, other pure and blended material sheet compositions may also be used to attain the desired properties. Specifically, the material sheet compositions disclosed herein display improved melt strength, while also resulting in containers having improved impact strength.

Embodiments of the present disclosure further include any one or more of the following paragraphs:

1. A blow molded container formed from a material sheet having a rheology melt strength ($R_{ms}$) of at least 30 Pa·s$^2$.
2. A method of making a blow molded container from a material sheet having a rheology melt strength ($R_{ms}$) of at least 30 Pa·s$^2$.
3. A blow molded container, comprising:
    a container wall comprising a thermoplastic polymer material having a rheology melt strength ($R_{ms}$) of at least 30 Pa·s$^2$.
4. The container of paragraph 3, wherein the material comprises a blend of a high melt strength polypropylene and a low melt strength polypropylene.
5. The container of paragraph 4, wherein the high melt strength polypropylene has a rheology melt strength ($R_{ms}$) of about 150 Pa·s$^2$ to about 10,000 Pa·s$^2$ and the low melt strength polypropylene has a rheology melt strength ($R_{ms}$) of about 30 Pa·s$^2$ to about 90 Pa·s$^2$.
6. The container of paragraph 4 or 5, wherein the material comprises from about 40 to about 90 percent by weight of the high melt strength polypropylene and from about 10 to about 60 percent by weight of the low melt strength polypropylene.
7. The container of paragraph 4 or 5, wherein the material comprises from about 30 to about 80 percent by weight of the high melt strength polypropylene and from about 20 to about 70 percent by weight of the low melt strength polypropylene.
8. The container of any one of paragraphs 4 to 7, wherein the thermoplastic polymer material has a rheology melt strength ($R_{ms}$) of at least 130 Pa·s$^2$.

9. The container of any one of paragraphs 4 to 7, wherein the thermoplastic polymer material has a rheology melt strength ($R_{ms}$) from about 130 Pa·s$^2$ to about 1,000 Pa·s$^2$.
10. The container of paragraph 3, wherein the material comprises a blend of a low melt strength polypropylene and a high density polyethylene.
11. The container of paragraph 10, wherein the low melt strength polypropylene has a rheology melt strength ($R_{ms}$) of at least 10 Pa·s$^2$.
12. The container of paragraph 10 or 11, wherein the material comprises from about 10 to about 90 percent by weight of the low melt strength polypropylene and from about 10 to about 90 percent by weight of the high density polyethylene.
13. The container of paragraph 10 or 11, wherein the material comprises from about 30 to about 80 percent by weight of the low melt strength polypropylene and from about 20 to about 70 percent by weight of the high density polyethylene.
14. The container of paragraph 3, wherein the material comprises a blend of a high melt strength polypropylene and a high density polyethylene.
15. The container of paragraph 14, wherein the material comprises from about 10 to about 90 percent by weight of the high melt strength polypropylene and from about 10 to about 90 percent by weight of the high density polyethylene.
16. The container of paragraph 14, wherein the material comprises from about 30 to about 80 percent by weight of the high melt strength polypropylene and from about 20 to about 70 percent by weight of the high density polyethylene.
17. The container of any one of paragraphs 3 to 16, wherein the container wall has a thickness from about 0.1 mm to about 2.0 mm.
18. A method of making a container, comprising:
    providing a material sheet comprising at least one thermoplastic polymer layer having a rheology melt strength ($R_{ms}$) of at least 30 Pa·s$^2$;
    forming the material sheet into a tube;
    sealing the tube at a seal area; and
    blow molding the tube to form a container.
19. The method of paragraph 18, further comprising:
    slitting the material sheet into more than one strip prior to forming the material sheet into a tube,
    wherein forming the material sheet into a tube comprises forming each of the more than one strips into a tube.
20. The method of paragraph 19, wherein the material sheet is slit in a machine direction.
21. The method of paragraph 18, wherein the thermoplastic polymer layer comprises a blend of a high melt strength polypropylene and a low melt strength polypropylene.
22. The method of paragraph 21, wherein the high melt strength polypropylene has a rheology melt strength ($R_{ms}$) of at least 1,000 Pa·s$^2$ and the low melt strength polypropylene has a rheology melt strength ($R_{ms}$) of at least 10 Pa·s$^2$.
23. The method of paragraph 21 or 22, wherein the thermoplastic polymer layer comprises from about 40 to about 90 percent by weight of the high melt strength polypropylene and from about 10 to about 60 percent by weight of the low melt strength polypropylene.
24. The method of paragraph 21 or 22, wherein the thermoplastic polymer layer comprises from about 30 to about 80 percent by weight of the high melt strength polypropylene and from about 20 to about 70 percent by weight of the low melt strength polypropylene.
25. The method of any one of paragraphs 21 to 24, wherein the thermoplastic polymer layer has a rheology melt strength ($R_{ms}$) of at least 130 Pa·s$^2$.
26. The method of any one of paragraphs 21 to 24, wherein the thermoplastic polymer layer has a rheology melt strength ($R_{ms}$) from about 130 Pa·s$^2$ to about 1,000 Pa·s$^2$.
27. The method of paragraph 18, wherein the thermoplastic polymer layer comprises a blend of a low melt strength polypropylene and a high density polyethylene.
28. The method of paragraph 27, wherein the low melt strength polypropylene has a rheology melt strength ($R_{ms}$) of at least 10 Pa·s$^2$.
29. The method of paragraph 27 or 28, wherein the thermoplastic polymer layer comprises from about 10 to about 90 percent by weight of the low melt strength polypropylene and from about 10 to about 90 percent by weight of the high density polyethylene.
30. The method of paragraph 27 or 28, wherein the thermoplastic polymer layer comprises from about 30 to about 80 percent by weight of the low melt strength polypropylene and from about 20 to about 70 percent by weight of the high density polyethylene.
31. The method of paragraph 18, wherein the thermoplastic polymer layer comprises a blend of a high melt strength polypropylene and a high density polyethylene.
32. The method of paragraph 31, wherein the thermoplastic polymer layer comprises from about 10 to about 90 percent by weight of the high melt strength polypropylene and from about 10 to about 90 percent by weight of the high density polyethylene.
33. The method of paragraph 31, wherein the thermoplastic polymer layer comprises from about 30 to about 80 percent by weight of the high melt strength polypropylene and from about 20 to about 70 percent by weight of the high density polyethylene.
34. The method of any one of paragraphs 18 to 33, wherein the container comprises a wall having a thickness from about 0.1 mm to about 2.0 mm.
35. The method of any one of paragraphs 18 to 34, wherein the material sheet comprises multiple thermoplastic polymer layers.
36. The method of any one of paragraphs 18 to 35, wherein the material sheet comprises one or more barrier layers.
37. The method of any one of paragraphs 18 to 36, wherein forming the material sheet into a tube comprises shaping the material sheet around a mandrel.
38. The method of any one of paragraphs 18 to 37, wherein the tube is sealed lengthwise.
39. The method of any one of paragraphs 18 to 38, wherein sealing the tube comprises lap sealing the tube.
40. The method of any one of paragraphs 18 to 39, wherein blow molding the tube comprises heating the tube and blowing the tube against a mold.
41. The method of any one of paragraphs 18 to 40, wherein the material sheet is coextruded or laminated.
42. The method of any one of paragraphs 21 to 26, further comprising blending the high melt strength polypropylene and the low melt strength polypropylene to form the material sheet.

43. The method of any one of paragraphs 27 to 30, further comprising blending the low melt strength polypropylene and the high density polyethylene.
44. The method of any one of paragraphs 31 to 33, further comprising blending the high melt strength polypropylene and the high density polyethylene.
45. A container made by the method of any one of paragraphs 18-44.

It will be appreciated that various above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A blow molded container, comprising:
  a container wall comprising a thermoplastic polymer material having a rheology melt strength ($R_{ms}$) of at least 30 Pa·s$^2$,
  wherein the material comprises:
   (i) a blend of a high melt strength polypropylene and a low melt strength polypropylene,
   (ii) a blend of a low melt strength polypropylene and a high density polyethylene, or
   (iii) a blend of a high melt strength polypropylene and a high density polyethylene.
2. The container of claim 1, wherein the material comprises the blend of the high melt strength polypropylene and the low melt strength polypropylene, the high melt strength polypropylene has a rheology melt strength ($R_{ms}$) of about 150 Pa·s$^2$ to about 10,000 Pa·s$^2$, and the low melt strength polypropylene has a rheology melt strength ($R_{ms}$) of about 30 Pa·s$^2$ to about 90 Pa·s$^2$.
3. The container of claim 1, wherein the material comprises the blend of the high melt strength polypropylene and the low melt strength polypropylene, and the material comprises from about 40 to about 90 percent by weight of the high melt strength polypropylene and from about 10 to about 60 percent by weight of the low melt strength polypropylene.
4. The container of claim 1, wherein the material comprises the blend of the high melt strength polypropylene and the low melt strength polypropylene, and the material comprises from about 30 to about 80 percent by weight of the high melt strength polypropylene and from about 20 to about 70 percent by weight of the low melt strength polypropylene.
5. The container of claim 1, wherein the material comprises the blend of the high melt strength polypropylene and the low melt strength polypropylene, and the material has a rheology melt strength ($R_{ms}$) of at least 130 Pa·s$^2$.
6. The container of claim 1, wherein the material comprises the blend of the high melt strength polypropylene and the low melt strength polypropylene, and the material has a rheology melt strength ($R_{ms}$) from about 130 Pa·s$^2$ to about 1,000 Pa·s$^2$.
7. The container of claim 1, wherein the material comprises the blend of the low melt strength polypropylene and the high density polyethylene, and the low melt strength polypropylene has a rheology melt strength ($R_{ms}$) of at least 10 Pa·s$^2$.
8. The container of claim 1, wherein the material comprises the blend of the low melt strength polypropylene and the high density polyethylene, and the material comprises from about 10 to about 90 percent by weight of the low melt strength polypropylene and from about 10 to about 90 percent by weight of the high density polyethylene.
9. The container of claim 1, wherein the material comprises the blend of the low melt strength polypropylene and the high density polyethylene, and the material comprises from about 30 to about 80 percent by weight of the low melt strength polypropylene and from about 20 to about 70 percent by weight of the high density polyethylene.
10. The container of claim 1, wherein the material comprises a blend of a high melt strength polypropylene and a high density polyethylene, and the material comprises from about 10 to about 90 percent by weight of the high melt strength polypropylene and from about 10 to about 90 percent by weight of the high density polyethylene.
11. The container of claim 1, wherein the material comprises a blend of a high melt strength polypropylene and a high density polyethylene, and the material comprises from about 30 to about 80 percent by weight of the high melt strength polypropylene and from about 20 to about 70 percent by weight of the high density polyethylene.
12. The container of claim 1, wherein the container wall has a thickness from about 0.1 mm to about 2.0 mm.

\* \* \* \* \*